(12) United States Patent
Sitter

(10) Patent No.: US 6,390,244 B1
(45) Date of Patent: May 21, 2002

(54) BRAKE WEAR INDICATOR

(75) Inventor: Don H. Sitter, Grass Lake, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/761,615

(22) Filed: Jan. 17, 2001

(51) Int. Cl.$^7$ .............................................. F16D 66/00
(52) U.S. Cl. ..................................................... 188/1.11
(58) Field of Search ...................... 188/1.11 R, 1.11 W, 188/79.51, 79.55, 79.53, 79.62

(56) References Cited

U.S. PATENT DOCUMENTS

| | | |
|---|---|---|
| 2,379,796 A | 7/1945 | Freeman et al. |
| 2,522,903 A | 9/1950 | Shively |
| 3,356,188 A | 12/1967 | Goldman et al. |
| 3,438,351 A * | 4/1969 | Kirkwood .................... 116/124 |
| 3,776,329 A * | 12/1973 | Hope et al. .................. 188/1 A |
| 4,776,438 A * | 10/1988 | Schandelmeier ........... 188/1.11 |
| 5,206,625 A * | 4/1993 | Davis .......................... 340/454 |
| 5,339,069 A | 8/1994 | Penner et al. |
| 5,358,076 A | 10/1994 | Lucas |
| 5,535,854 A | 7/1996 | Prince |

* cited by examiner

Primary Examiner—Christopher P. Schwartz
Assistant Examiner—Benjamin A Pezzlo
(74) Attorney, Agent, or Firm—Scott M. Oldham; Hahn Loeser + Parks LLP

(57) ABSTRACT

A brake wear indicator to provide visual and tactile indication of unacceptable brake wear. The brake wear indicator has a hub drive attached to a cam shaft, a brake wear disk attached to the hub drive and a body attached to a slack adjuster lever. The brake wear disk has a wear detector lug. The body has two the travel limit lugs which extend towards the centerline of the brake wear disk and are on the end of flexible fingers. When the brake linings are approaching unacceptable wear, the wear detector lug contacts one of the travel limit lugs and pushes the travel limit lug and the end of the corresponding finger away from the adjacent outer surface of the body. The rising of the end of the finger above the adjacent surface provides visual and tactile indication of unacceptable brake wear.

11 Claims, 8 Drawing Sheets

BRAKE WEAR INDICATOR

BACKGROUND OF THE INVENTION

This invention relates generally to wear indicators for use with a brake having a brake wear adjuster and more particularly to a brake wear indicator that provides a positive feedback indicating unacceptable brake wear.

In an air brake, as is known in the prior art, an S-shaped cam at the end of a cam shaft is rotated by a slack adjuster lever to activate the brake shoes and put them in contact with the brake drum to slow or stop the vehicle. As wear occurs in the brake linings, the S-cam must be adjusted by rotation of the cam. Adjustments are made in the brake cam by rotation of the cam shaft relative to the slack adjuster lever. Adjustment beyond a certain point can result in a failure of the brake to set and can result in failure of the brakes in use. Since multiple parties may do the adjustment on the brakes, it is important that a person responsible for maintaining the brakes to readily determine the amount of brake lining wear. One way of doing this is by visual inspection of the brake lining. Because of the relative inaccessibility of the brake cam and the brake linings, it is desirable to have a visually observable wear indicator. It is even more desirable to have a wear indicator that may be tactilely observed by the maintenance person. This is particularly desirable where the brake assembly uses stone shields to exclude foreign material. Visual access to the brake lining is further reduced.

The foregoing illustrates limitations known to exist in present brake wear indicators. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a brake wear indicator which uses a body having a pair of resilient fingers in an outer circumferential wall with a wear limit lug at the end of each finger. Positioned within the body is a rotatable brake wear disk which is connected to the brake adjuster cam. The brake wear disk has a wear detector lug thereon. As the brakes are adjusted to compensate for brake lining wear, by rotating the cam shaft relative to a slack adjuster lever, the brake wear disk rotates relative to the body. When the brakes are reaching the limit of their adjustment, the wear detector lug contacts one of the wear limit lugs. Continued rotation of the cam shaft relative to the slack adjuster lever results in the end of the finger being lifted above the outer surface of the body, thereby indicating unacceptable brake wear.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
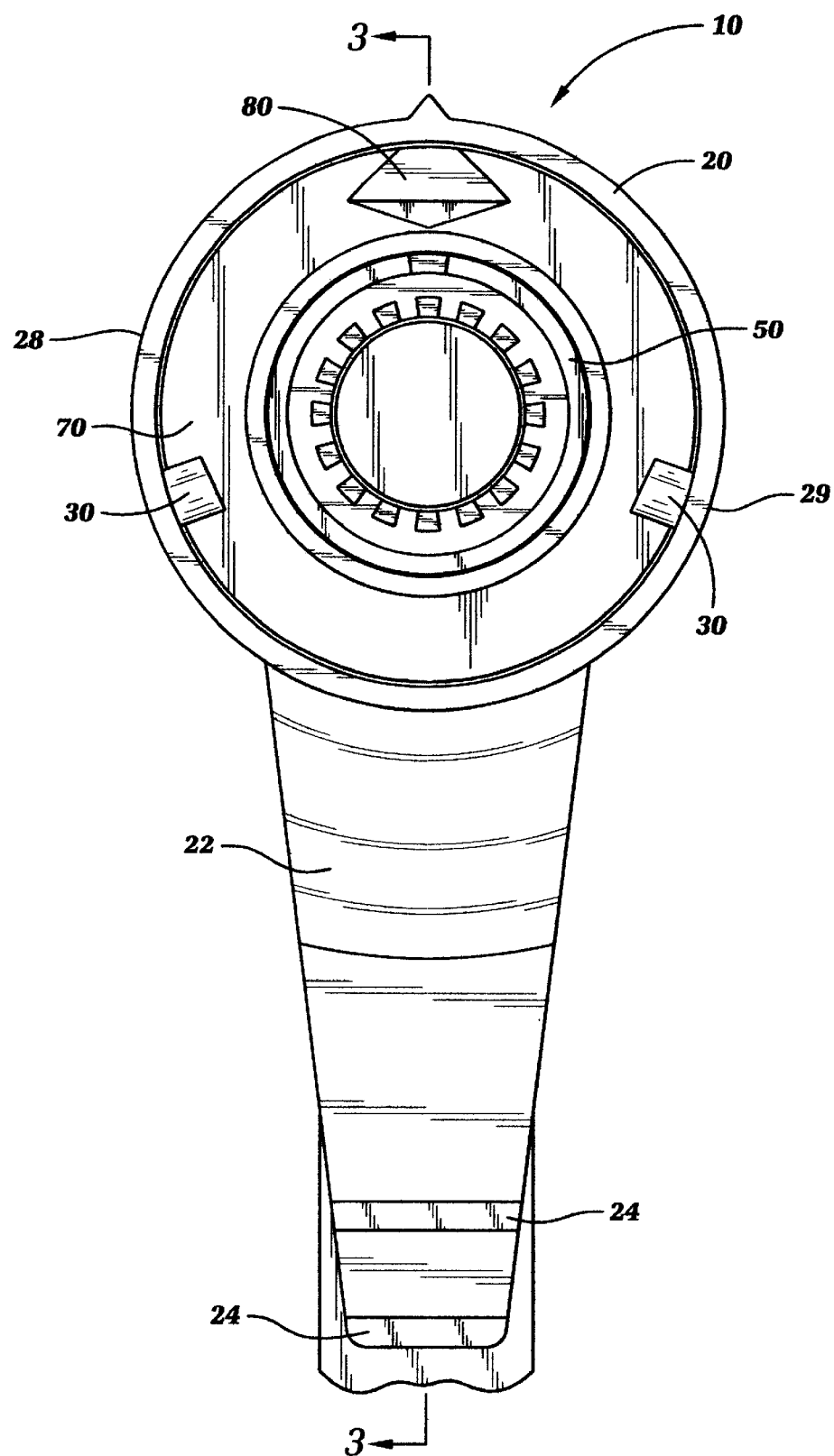
FIG. 1 is a front view of a brake wear indicator.
Figure 2:
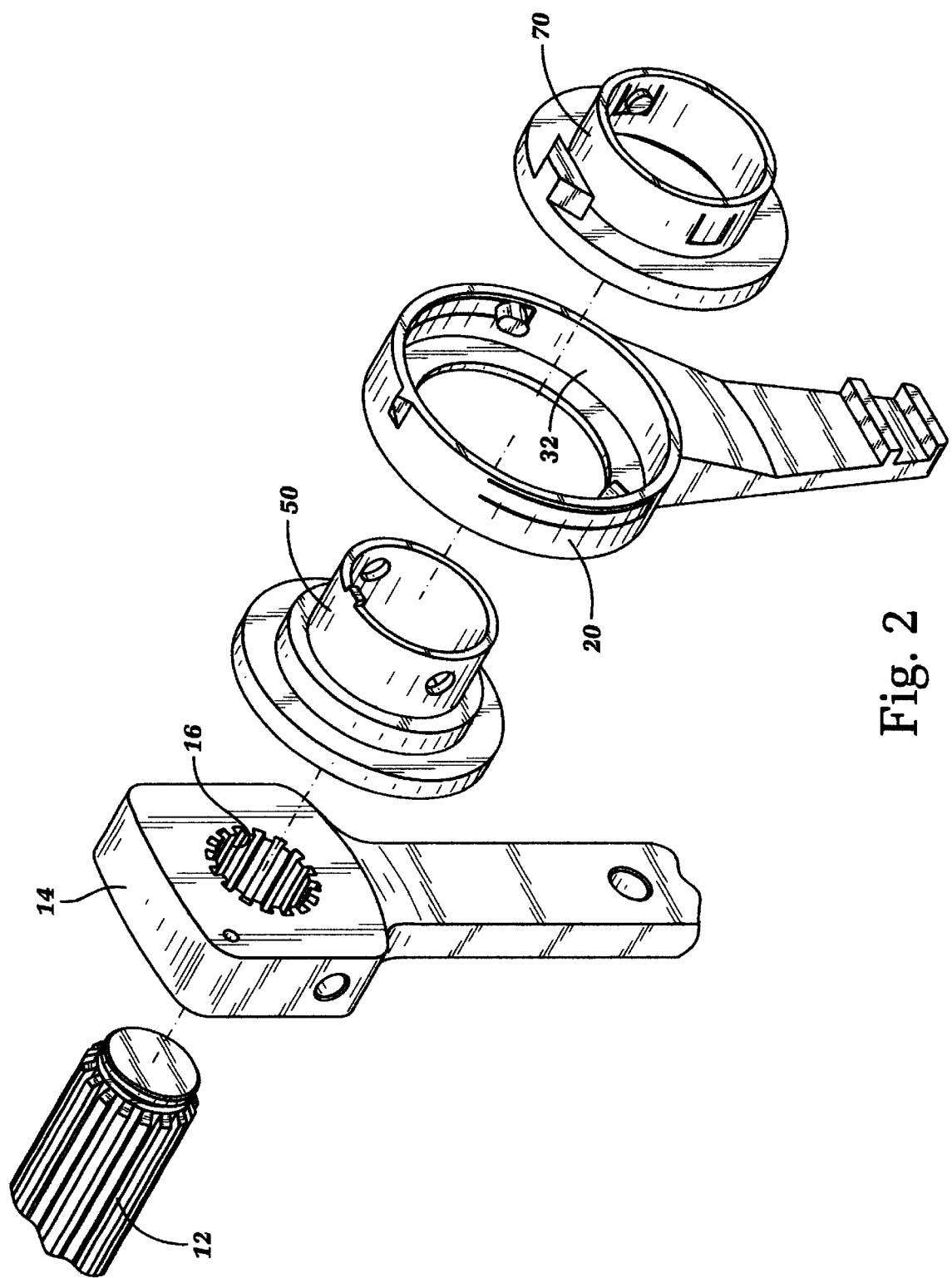
FIG. 2 is an exploded perspective view of the brake wear indicator shown in FIG. 1, illustrating the attachment of the brake wear indicator to the cam shaft and slack adjuster lever of an S-cam brake.
Figure 3:
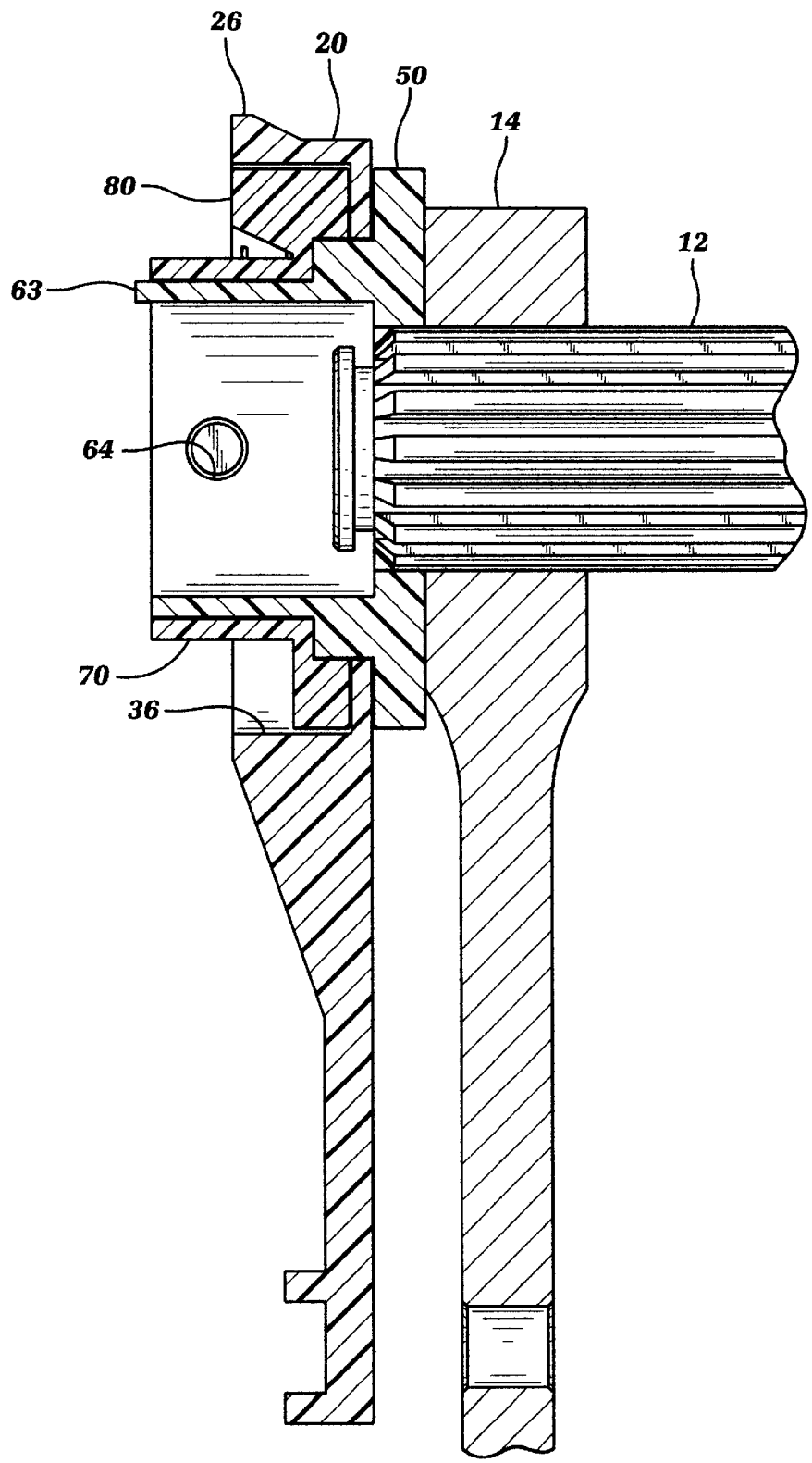
FIG. 3 is a cross-section of the brake wear indicator shown in FIG. 1.
Figures 4, 4A:
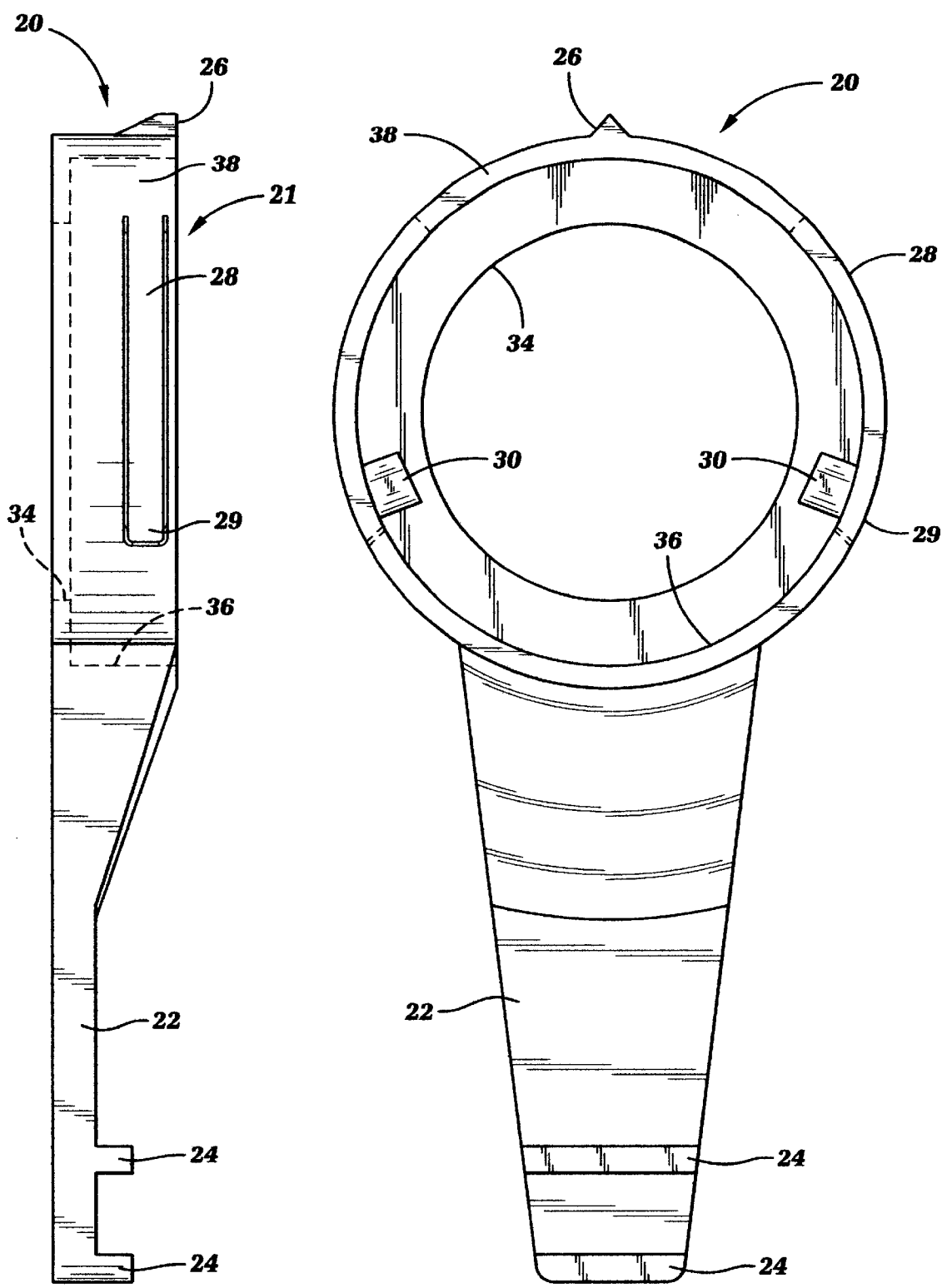
FIGS. 4 and 4A are side and front views, respectively, of a brake wear indicator body.
Figure 5:
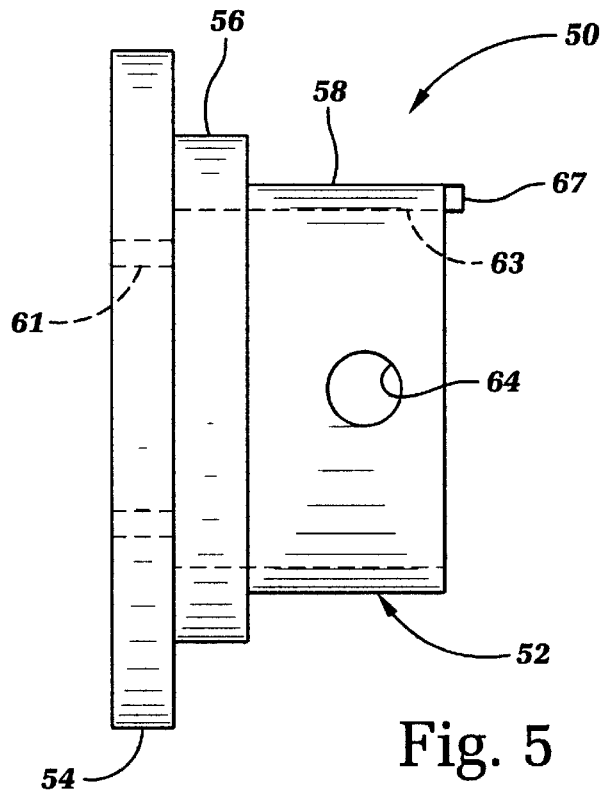
FIGS. 5 and 5A are side and front views, respectively, of a hub drive.
Figure 5A:
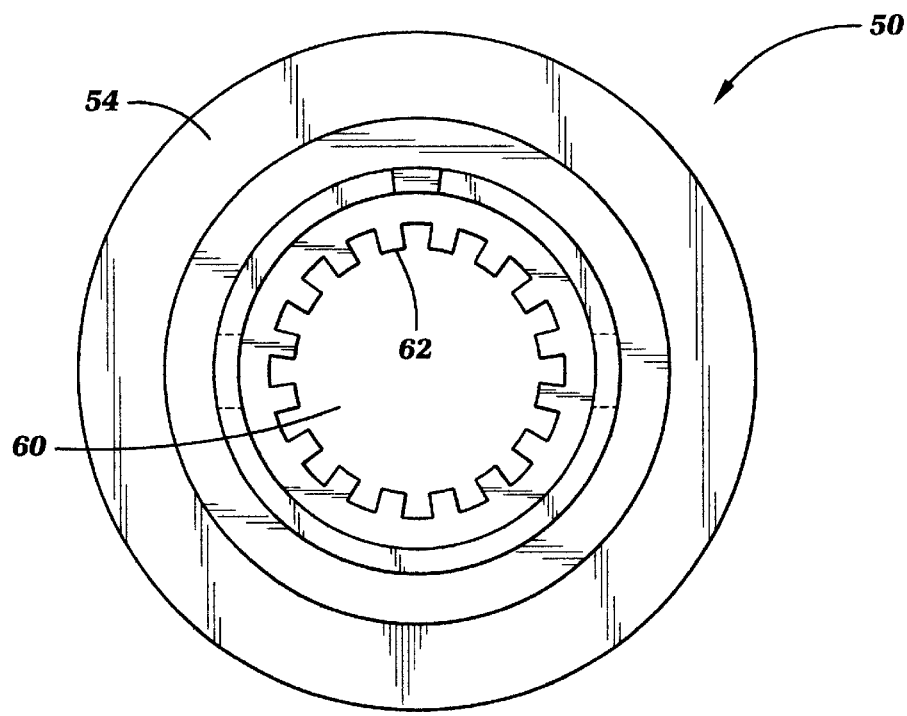
Figure 6:
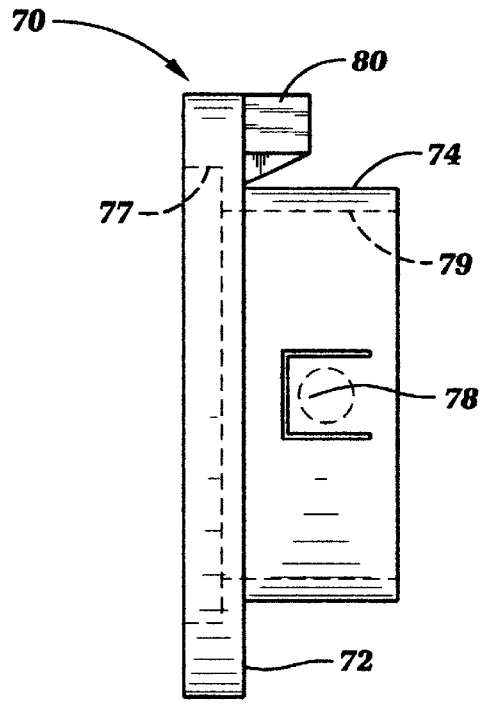
FIGS. 6 and 6A are side and front views, respectively, of a brake wear disk.
Figure 6A:
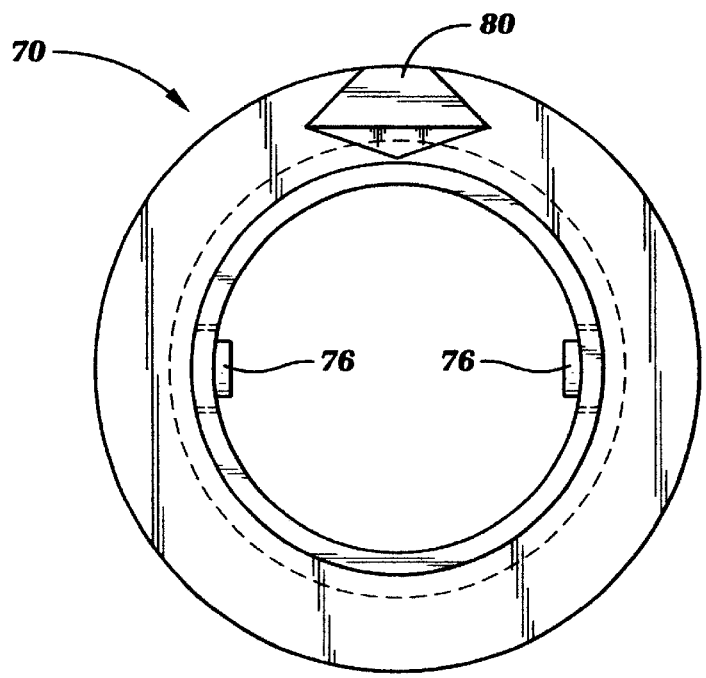

As is known in the prior art, brake shoes are spread apart by rotation of an S-cam. When the brakes are applied, air enters a brake chamber. The brake chamber contains a diaphragm and a push rod which converts the air pressure behind the diaphragm to a linear driving force. The push rod extends from the brake chamber and is pivotally connected to a slack adjuster lever 14. The slack adjuster lever rotated when pushed by the push rod. The S-cam is attached to the slack adjuster lever, typically by a splined cam shaft 12. Rotation of the slack adjuster lever rotates the cam shaft and the attached S-cam. Rotation of the S-cam causes the brake shoes to spread apart applying a braking force to the brake drum. As the brake pads wear, the brake shoes have to be pushed further apart to continue to apply a proper braking force against the brake drum. Ultimately, it becomes necessary to adjust the brakes.

Adjusting the brakes involves rotating the S-cam with respect to the slack adjuster lever with the brakes not applied to reduce the clearance between the brake linings and the brake drum (i.e., to force the brake shoes farther apart). This is accomplished by means of a slack adjusting mechanism which is typically built into the slack adjuster lever. When the brakes are properly adjusted, the push-rod, within its limited range of motion, can again rotate the S-cam enough to forcefully engage the brake linings with the brake drum. The slack adjusting mechanism can either be manual or automatic.

After adjustment, the brake linings will continue to wear and ultimately, there will be insufficient brake lining thickness left for continued safe operation of the vehicle. At this point, the metallic rivets used to attach the brake lining can contact and damage the brake drum. Additionally, some types of brakes may be worn at this point to the degree that the cam tip of the S-cam passes under the cam roller. This resulting "cam flip" will render that brake position inoperable.

The present invention is a brake wear indicator 10 which includes a means for indicating brake wear, the means for indicating brake wear having two conditions, a first condition indicating acceptable brake wear and a second condition indicating unacceptable brake wear. Preferably, the indication is both visual and tactile. The brake wear indicator consists of three primary parts, a body 20 which is attached to the slack adjuster lever 14, a hub drive 50 which is attached to an end of the cam shaft 12 and a wear indicator disk 70 which is attached to the hub drive 50. The hub drive 50 and wear indicator disk 70 rotate with the cam shaft 12 relative to the slack adjuster lever 14 and the attached body 20 when the slack adjustment mechanism operates to adjust the brakes.

The hub drive 50 has a stepped circular exterior 52 which has three portions, a bearing flange portion 54, a smaller diameter body pilot portion 56 next to the bearing flange portion and a yet smaller diameter wear disk pilot portion 58. The hub drive 50 has an internal aperture 60 extending therethrough. In the preferred embodiment, the internal aperture 60 also is stepped with a smaller diameter portion 61 in the bearing flange portion 54 and a larger diameter portion 63 in the body pilot and wear disk portions 54, 56. Typically, the cam shaft 12 is splined. Therefore, preferably, the internal aperture 60 includes correspondingly shaped and sized splines 62 to engage the splined end of the cam shaft 12. The hub drive further includes two lock holes 64 which are used to engage corresponding resilient snap fingers 76 on the brake wear disk 70.

The brake wear disk 70 is also generally circular like the hub drive 50. It has a stepped circular exterior consisting of two portions, a larger diameter body flange portion 72 and a smaller diameter axially extending portion 74. The brake wear disk 70 also has a stepped internal aperture having a larger diameter portion 77 and a smaller diameter portion 79 that engages the hub drive wear disk pilot portion 58. The hub drive body pilot portion 56 extends into the larger diameter portion 77. Formed in the axially extending portion 74 are two resilient fingers 78 which have a snap finger 76 at the free end thereof. When the brake wear disk 70 is attached to the hub drive 50, the snap fingers 76 flex outward of the axially extending portion 74 until the hub drive 50 is fully inserted into the brake wear disk 70 internal aperture, where the snap fingers 76 engage the lock holes 64 to retain the brake wear disk 70 attached to the hub drive 50. The brake wear disk 70 has an axially extending wear detector lug 80 attached to the body flange portion 72. The wear detector lug 80 interacts with a travel limit lug 30 on the body 20 to provide indication of unacceptable brake wear.

The body 20 is positioned and captured between the hub drive 50 and the wear indicator disk 70 when the hub drive 50 and the wear indicator disk 70 are attached to one another. The body 20 consists of a circular hub drive and wear indicator disk receiving portion 21 with a longitudinally extending tie off stem 22 extending therefrom. The tie off stem 22 includes at least one strap retaining lug 24. The body 20 is attached to the slack adjuster lever 14 with one or more ties, such as nylon cable ties. The body circular portion 21 includes an internal stepped circular aperture having a hub drive receiving portion 34 and a larger diameter wear disk portion 36. Two flexible fingers 28 are formed in an outer circumferential wall 38 of the wear disk portion 36. Located at the free end 29 of each flexible finger is a travel limit lug 30 which interacts with the wear detector lug 80. An installation index 26 is positioned at the top of the body 20.

To install the wear detector indicator 10, the slack adjusting mechanism must be set to an initial position, representing no brake lining wear. If the brake linings have just been replaced, then the slack adjusting mechanism is already in this initial position. If the wear detector indicator 10 is being installed with partially used brake linings, then the slack adjusting mechanism must be manually reset to this initial position. After installation of the wear detector indicator 10, the slack adjusting mechanism must be reset to the "adjusted" position it was in prior to installing the wear detector indicator 10.

First, the hub drive 50 is slid onto the splined end of the can shaft 12. The hub drive 50 is installed with its vertical axis, indicated by indicator 67 aligned with the longitudinal axis of the slack adjuster lever 14. The body 20 is then slid over the body pilot portion 56 of the hub drive 50. Ties, not shown, are placed around the tie off stem 22 adjacent the strap retaining lugs 24 and the slack adjuster lever 14 to attach the body 20 to the slack adjuster lever 14. Preferably, the body 20 is attached with the installation index 26 aligned with the hub drive indicator 67. Next, the brake wear disk 70 is attached to the hub drive 50 with the wear detector lug 80 aligned with the installation index 26 and the hub drive indicator 67. The resilient fingers 78 flex when the brake wear indicator 70 is attached to the hub drive 50 allowing the snap fingers 76 to slide over the wear disk pilot portion 58 and then snap into the lock holes 64 to retain the brake wear disk 70 attached to the hub drive 50. The body 20 is captured between the hub drive 50 and the brake wear disk 70. Typically, a snap ring or retaining ring (not shown) is attached to the end of cam shaft 14.

In operation, the brake wear indicator 10 moves with the slack adjuster lever 14 whenever the brakes are applied. Except when the slack adjusting mechanism is adjusting the cam shaft 14 by rotating it relative to the slack adjuster lever splined aperture 16, the hub drive 50 and attached brake wear disk 70 remain stationary relative to the body 20 and the slack adjuster lever 14. Whenever the cam shaft 14 is rotated, for brake adjustment, the attached hub drive 50 and brake wear disk 70 rotate relative to the body 20. Depending upon the design of the slack adjusting mechanism, the cam shaft 14, hub drive 50 and brake wear disk 70 will rotate either clockwise or counterclockwise, which is why two travel limit lugs 30 are provided. This is a direct means of accommodating RH and LH brake assemblies with one non-handed part. As the brake wear disk 70 rotates, the wear detector lug 80 will eventually contact one of the travel limit lugs 30. Both the wear detector lug 80 and the travel limit lugs 30 have complementary ramped surfaces to facilitate the action of the wear detector lug 80 on the travel limit lug 30. The wear detector lug 80 moves the travel limit lug 30 away from the centerline of the brake wear disk 70 and ultimately raises the outer surface of the end 29 of finger 28 above the surface of the body outer circumferential wall 38. The size of the travel limit lug 30 and the wear detector lug 80 are selected based upon the size of the brake to which the brake wear indicator 10 is attached, such that when the brake linings have reached a limit of unacceptable wear, the end 29 of finger 28 has been raised above the body outer circumferential wall 38, providing indication of unacceptable brake wear.

Heavy vehicle brakes are provided in multiple sizes. Currently, the four most popular sizes in the United States are:

| | | |
|---|---|---|
| 12¼ × 7½ | FMSI 4692 | "A" |
| 16½ × 7 STD | FMSI 4515 | "B" |
| 16½ × H. Vol | FMSI 4707 | "C" |
| 16½ × 7 SAP | FMSI 4709 | "D" |

(The letters represent a size designation for a travel limit lug 80a, 80b of the present invention)

Because of the different size brakes used on heavy vehicles, it is necessary to size the wear detector lug 80 so that the end 29 of finger 28 will properly indicate unacceptable brake wear. One way of accomplishing this is to provide a different brake wear disk 70 for each brake size.

Figure 7:
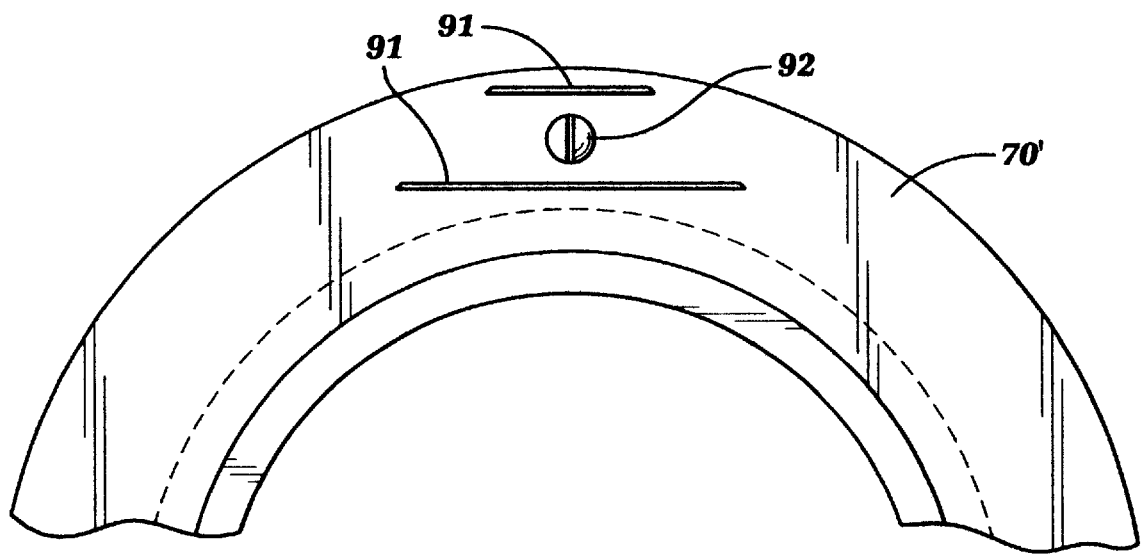
FIGS. 7 and 7A are partial front and side views, respectively, of an alternate embodiment of a brake wear disk.
Figure 7A:
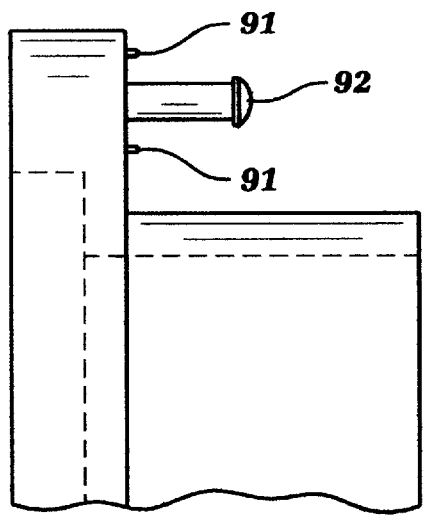
Figure 8:
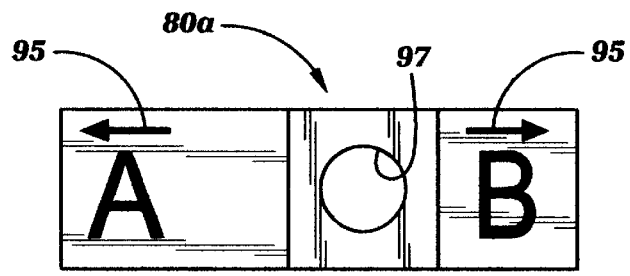
FIGS. 8, 8A, 9 and 9A are front and side views of two sizes of an alternate embodiment of a wear detector lug for use with the brake wear disk shown in FIGS. 7 and 7A.
Figure 8A:
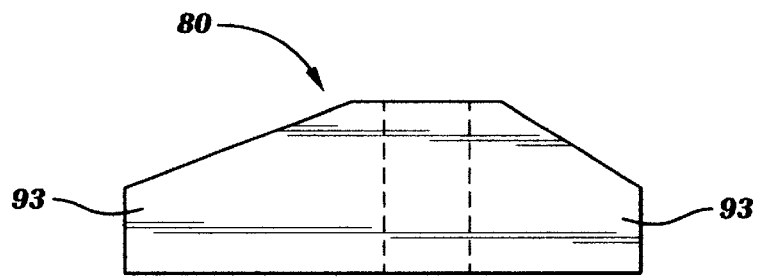
Figure 9:
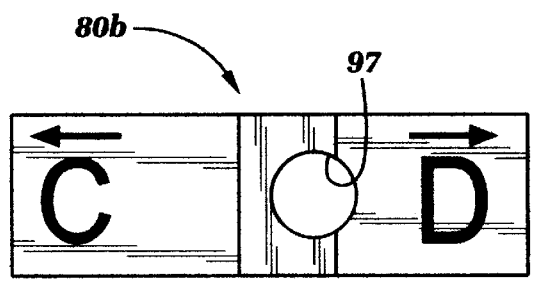
Figure 9A:
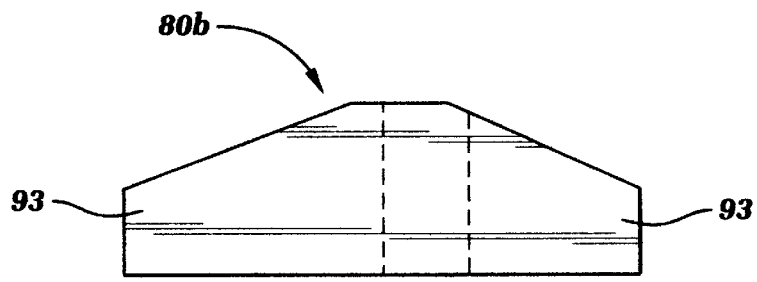

FIGS. 7 through 9A show an alternate embodiment of the brake wear disk 70' and wear detector lugs 80a, 80b which provides wear detector lugs 80a, 80b for the most common brake sizes. The brake wear disk 70' uses interchangeable wear detector lugs 80a, 80b which have a split post receiving aperture 97 for fitting the wear detector lug 80a, 80b onto the brake wear disk 70'. The brake wear disk 70' includes two guides or guide posts 91 for aligning and retaining the wear detector lug 80a, 80b in the proper position along with a split post 92 having a head for also retaining the wear detector lug 80a, 80b. Each wear detector lug 80a, 80b contains two ramped sections 93, each marked with a letter (A, B, C, D) which corresponds to one of the common brake sizes listed above. Each wear detector lug 80a, 80b contains two arrows 95, which are used to properly align the appropriate ramped section 93. The ramp sections have different widths and heights, which are selected to provide proper indication of unacceptable brake wear for the corresponding brake size. During installation, the installer determines the appropriate ramped section, A, B, C or D, selects the appropriate wear detector lug 80a, 80b and installs the selected wear detector lug 80a, 80b with the arrow 95 on the corresponding ramp section 93 pointing towards the axle of the vehicle on which the wear detector indicator 10 in being installed.

Having described the invention, what is claimed is:

1. A brake wear indicator for use with a cam shaft (12) and slack adjuster lever (14) of an S-cam brake, the brake wear indicator comprising:
   a body (20) adapted for attachment to the slack adjuster lever, the body having an aperture (32) therein;
   a hub drive (50) adapted for attachment to the cam shaft the hub drive being positioned within the body aperture;
   a brake wear disk (70) engageable with the hub drive and being rotatable relative to the body; and
   means for indicating brake wear, the means having a first condition indicating acceptable brake wear and a second condition indicating unacceptable brake wear, the means switching from the first condition to the second condition as a result of rotational interaction between the body and the brake wear disk.

2. The brake wear indicator according to claim 1, wherein the means comprises:
   the body having two flexible wear limit fingers (28) thereon and a travel limit lug (30) at the end (29) of each finger; and
   the brake wear disk having a wear detector lug (80) thereon, the brake wear disk rotating relative to the body as the cam shaft rotates relative to the slack adjuster lever, the wear detector lug engaging one of the travel limit lugs causing the means to switch from the first condition to the second condition by moving the travel limit lug away from an axis of rotation of the brake wear disk, thereby causing the end of the finger to extend above an outer surface of the body, the extension of the end of the finger above the outer surface of the body indicating unacceptable brake wear.

3. The brake wear indicator according to claim 2, wherein the wear detector lug is integrally formed with the brake wear disk.

4. The brake wear indicator according to claim 2, wherein the wear detector lug is engageably attached to the brake wear disk.

5. The brake wear indicator according to claim 1, wherein the body has a longitudinal portion (22) extending away from the body aperture.

6. The brake wear indicator according to claim 5, wherein the body longitudinal portion has at least one strap retaining lug (24) thereon.

7. The brake wear indicator according to claim 1, where the brake wear disk has at least two resilient snap fingers (76) extending therefrom, the hub drive has at least two lock holes (64) therein, the snap fingers retainingly engaging the lock holes when the brake wear disk engages the hub drive.

8. A brake wear indicator for use with a cam shaft (12) and slack adjuster lever (14) of an S-cam brake, the brake wear indicator comprising:
   a body (20) adapted for attachment to the slack adjuster lever, the body having a circular aperture (32) therein, the body having two flexible fingers (28) formed in an outer circumferential wall (38) of the circular aperture, each finger having a travel limit lug (30) at an end (29) thereof, an outer surface of each finger normally being level with the outer surface of the outer circumferential wall (38);
   a hub drive (50) adapted for attachment to the cam shaft, the hub drive being positioned within the body aperture; and
   a brake wear disk (70) engageable with the hub drive and being rotatable relative to the body, the body being retainingly captured between the hub drive and the brake wear disk, the brake wear disk having an axially extending wear detector lug (80) attached thereto, the brake wear disk rotating relative to the body as the cam shaft rotates relative to the slack adjuster lever, the wear detector lug engaging one of the travel limit lugs causing the end of the finger to extend above an outer surface of the body by moving the travel limit lug away from an axis of rotation of the brake wear disk, the extension of the end of the finger above the outer surface of the body indicating unacceptable brake wear.

9. The brake wear indicator according to claim 8, where the brake wear disk has at least two resilient snap fingers extending therefrom, the hub drive has at least two lock holes therein, the snap fingers retainingly engaging the lock holes when the brake wear disk engages the hub drive.

10. A brake wear indicator for use with a cam shaft and slack adjuster lever of an S-cam brake, the brake wear indicator comprising:
   a hub drive (50) adapted for attachment to the cam shaft, the hub drive having a stepped circular exterior (52) comprising a bearing flange portion (54) having a first diameter, a body pilot portion (56) having a second diameter and a wear disk pilot portion (58) having a third diameter, the body pilot portion being between the bearing flange portion and the wear disk pilot portion, the first diameter being greater than the second diameter, the second diameter being greater than the third diameter, the hub drive having an internal aperture (60) extending therethrough and coaxial with the stepped circular exterior;
   a body (20) adapted for attachment to the slack adjuster lever, the body having a stepped circular aperture (32) therein, the stepped circular aperture comprising a hub drive receiving portion (34) having a first diameter and a wear disk receiving portion (36) having a second diameter, the body having two flexible fingers (28) formed in an outer circumferential wall (38) of the wear disk receiving portion of the stepped circular aperture, each finger having a travel limit lug (30) at an end (29) thereof, an outer surface of each finger normally being level with the outer surface of the outer circumferential wall; and
   a brake wear disk (70) engageable with the hub drive and being rotatable relative to the body, the brake wear disk having a stepped circular exterior, the stepped circular exterior comprising a body flange portion (72) having a first diameter and an axial portion (74) having a second diameter, the first diameter being greater than the second diameter, the body being retainingly captured between the hub drive bearing flange and the brake wear disk body flange portion, the brake wear disk having an axially extending wear detector lug (80) attached thereto, the brake wear disk rotating relative to the body as the cam shaft rotates relative to the slack adjuster lever, the wear detector lug engaging one of the travel limit lugs causing the end of the finger to extend above an outer surface of the body by moving the travel limit lug away from an axis of rotation of the brake wear disk, the extension of the end of the finger above the outer surface of the body indicating unacceptable brake wear.

11. The brake wear indicator according to claim 10, where the brake wear disk has at least two resilient snap fingers extending therefrom, the hub drive has at least two lock holes therein, the snap fingers retainingly engaging the lock holes when the brake wear disk engages the hub drive.

* * * * *